Feb. 13, 1940. A. H. HABERSTUMP 2,190,456
SUPPORT FOR CENTRIFUGES
Filed April 9, 1937 3 Sheets-Sheet 1
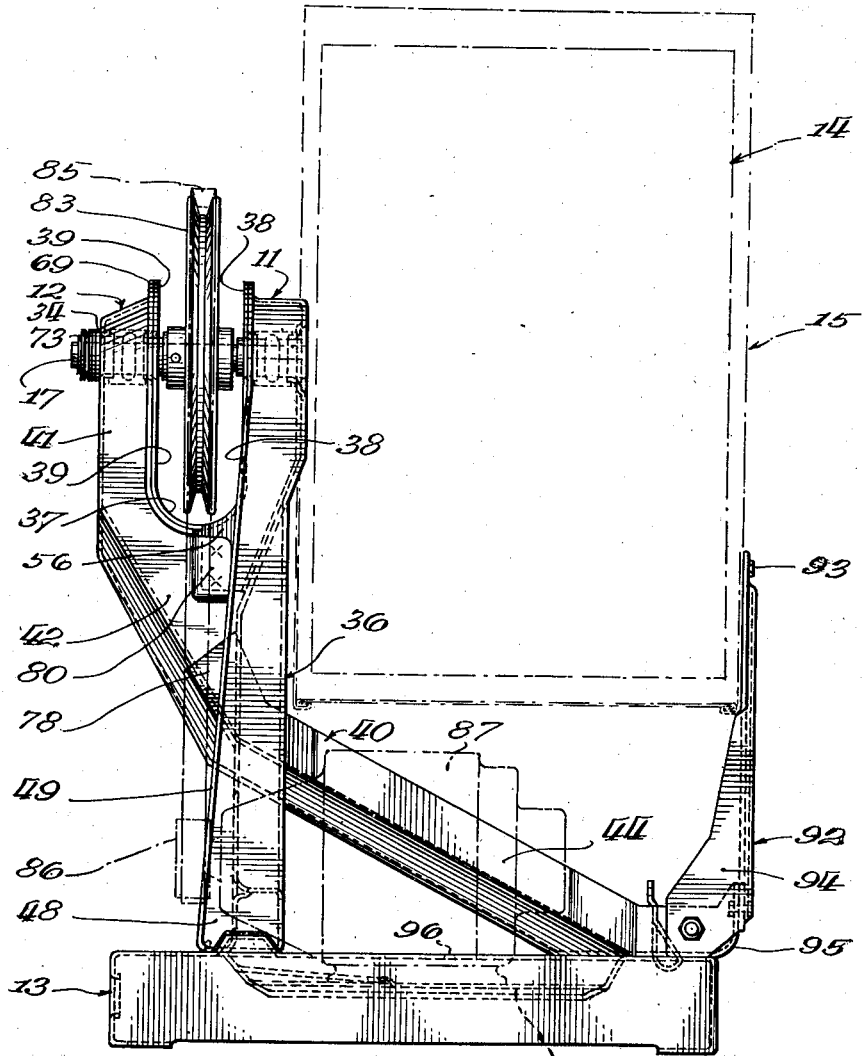
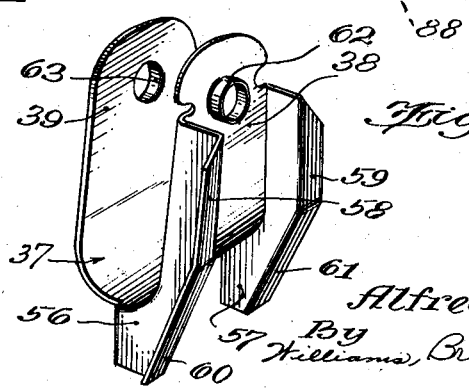
Inventor:
Alfred H. Haberstump
By Williams, Bradbury, McCaleb & Hinkle
Attys.

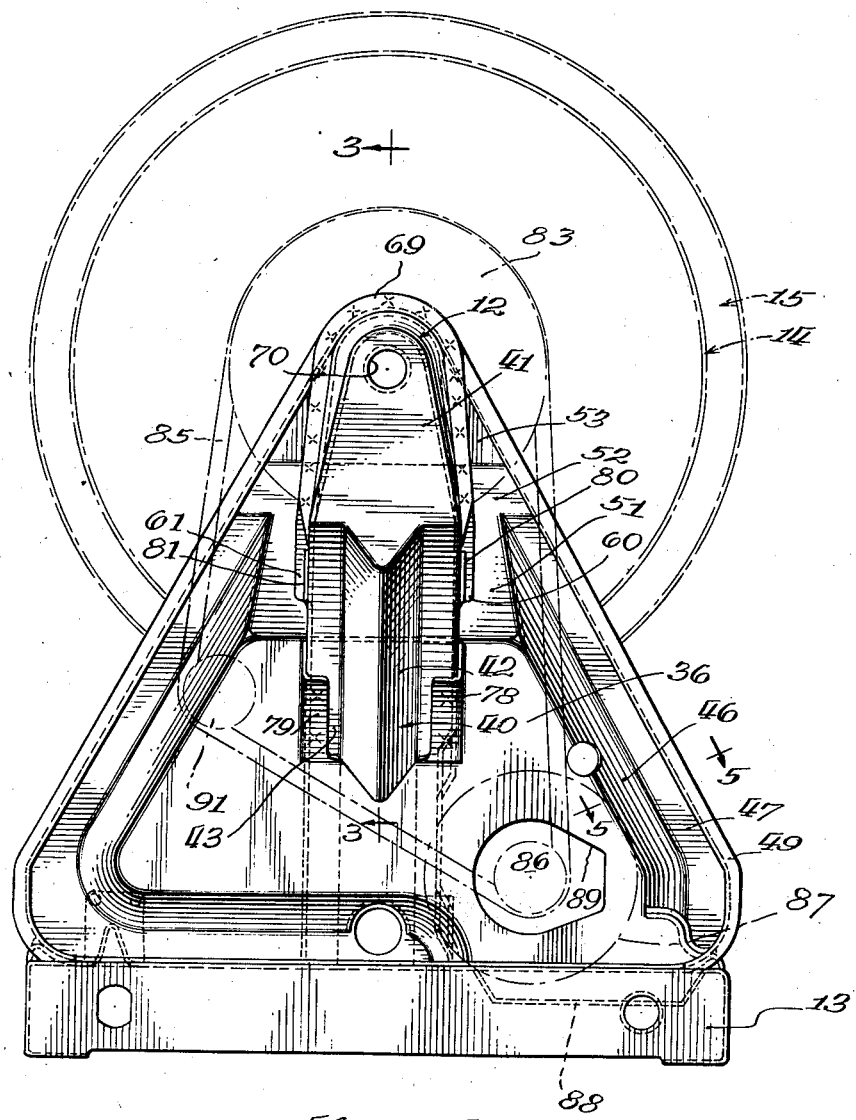

Feb. 13, 1940.  A. H. HABERSTUMP  2,190,456
SUPPORT FOR CENTRIFUGES
Filed April 9, 1937   3 Sheets-Sheet 3

Inventor
Alfred H. Haberstump
By Williams, Bradbury, McCaleb & Hinkle
Attys.

Patented Feb. 13, 1940

2,190,456

UNITED STATES PATENT OFFICE 2,190,456

SUPPORT FOR CENTRIFUGES

Alfred H. Haberstump, Detroit, Mich., assignor, by mesne assignments, to Bendix Home Appliances, Inc., Detroit, Mich., a corporation of Delaware Application April 9, 1937, Serial No. 135,955

13 Claims. (Cl. 210—63)

The present invention relates to a fabricated support for a centrifuge, and particularly to a support for a centrifugal extractor.

In the copending application of Andrew O. McCollum and Victor Lovett, Serial No. 135,954, filed April 9, 1937, (McCollum and Lovett case 1), there is disclosed a support for a centrifuge mounted for rotation on a horizontal axis. The centrifuge is secured to one end of a relatively short shaft, the other end of which is mounted in a pair of bearings secured to the support. The support itself consists of a base, a vertically disposed, substantially triangular front bearing support secured to said base, and a relatively narrow rear bearing support extending diagonally downward through an aperture in the front support and secured to the latter and to the base at a point below the centrifuge.

The primary object of the present invention is to provide a support embodying the above described features that can be fabricated and assembled both readily and economically.

A further object of the invention is to provide a support made of a plurality of stampings so constructed and arranged that when assembled they form a rigid box-like bearing support.

A further object of the invention is to provide a support comprising rigid box-like bearing supporting portions, the parts of which may be welded together to form the support.

A further object of the invention is to provide a new and improved bearing housing and supporting structure therefor.

A further object is to provide a new and improved supporting structure for a pair of spaced-apart axially aligned bearing housings.

A still further object of the invention is to provide a pedestal type support for a shaft consisting of a minimum of parts that may be readily secured together in assembled relationship to form a rigid structure.

Other objects and advantages of the invention will appear from the ensuing description of an illustrative embodiment thereof.

In the course of the description reference is had to the following drawings, in which:

Fig. 1 is a side elevation of a support with the centrifuge and driving means therefor shown in phantom;

Fig. 2 is a rear elevation of the apparatus shown in Fig. 1;

Fig. 4 is a perspective view showing the details of a portion of the support, and Fig. 5 is a partial cross-section view, taken along the line 5—5 of Fig. 2.

Figure 3:
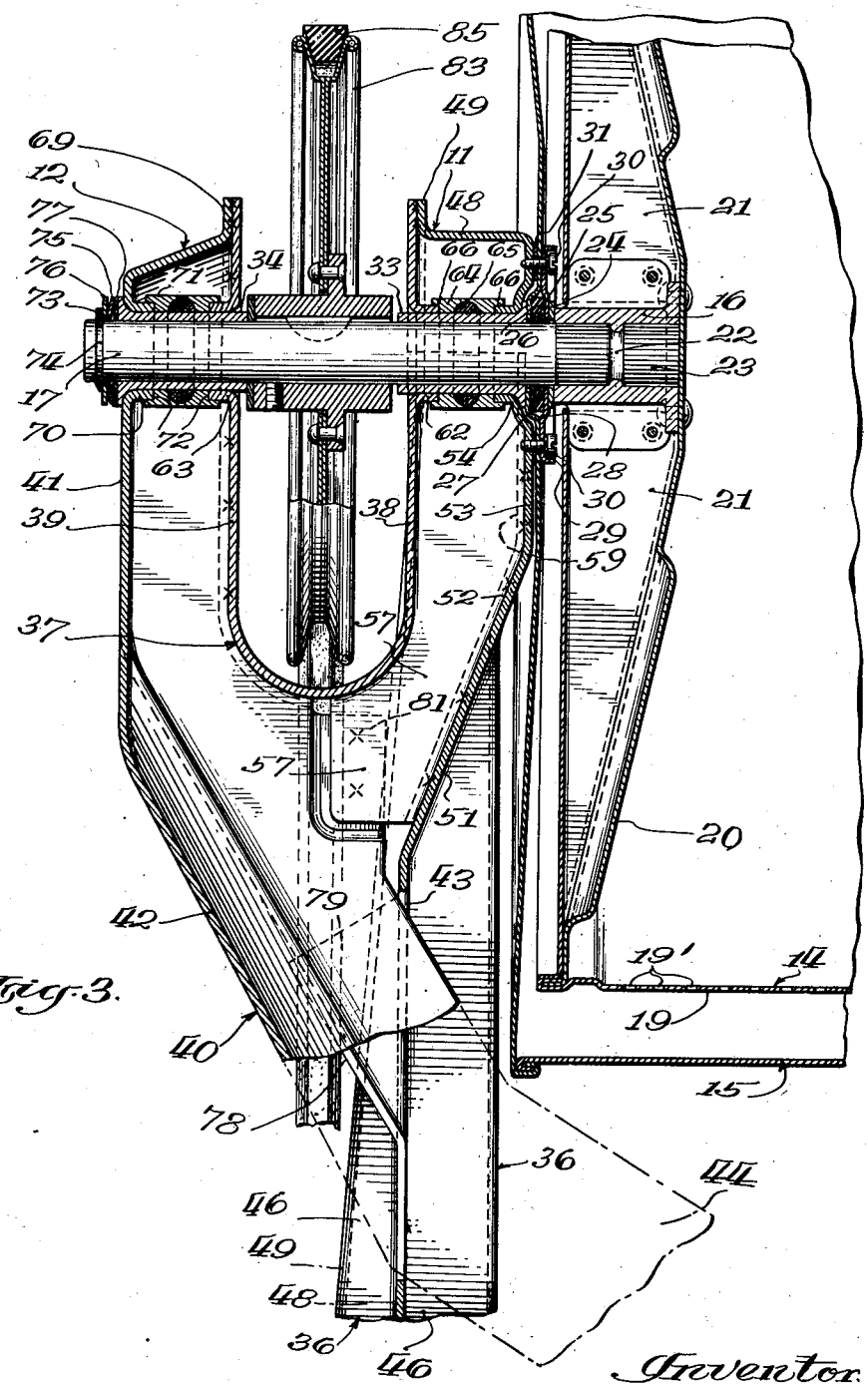
Fig. 3 is a partial vertical cross-section view, taken along the line 3—3 of Fig. 2, and shows in detail the assembly of the bearing support.

The supporting means of the present invention comprises a front bearing support 11, a rear bearing support 12, both mounted upon a horizontally disposed base 13, and assembled from relatively thin stampings in a manner hereinafter to be described to form a rigid support for a centrifuge 14 mounted for rotation on a horizontal axis. The centrifuge 14 is illustrated as a cylinder forming the rotating part of a washing apparatus, but it should be apparent to those skilled in the art that the invention is not limited to this specifically illustrated embodiment.

The cylinder is surrounded by a stationary casing 15 and is secured to a hub 16 of zinc cast on the end of a horizontally disposed shaft 17 that is mounted in cantilever fashion for rotation in the bearing supports 11 and 12. From Fig. 1 it may be seen that the shaft 17 is relatively short as compared to the length of the cylinder and that it is located above the rear end of the base 13 at a height approximately equal to the diameter of the cylinder. The rear bearing 12 is substantially above the rear end of base 13, while the front bearing 11 is spaced forward therefrom about one-quarter of the length of the base. The front end of the cylinder 14 is substantially over the front end of the base.

Referring particularly to Fig. 3, it may be seen that the cylinder 14, the particular construction of which forms no part of this invention, comprises a center panel 19 and a rear panel 20 (the front panel not being shown) mounted upon a plurality of spokes 21 suitably attached to the hub 16. The cylinder is provided with peripheral perforations 19' in accordance with well known principles of liquid extraction. The hub 16 is secured to shaft 17 against longitudinal and rotated displacement by an annular groove 22 and longitudinal knurling 23, respectively. It is prevented from wearing against the casing 15 by a thrust washer 24. Leakage of liquid along the shaft from within the casing 15 is prevented by a plurality of flexible sealing rings 25 bearing tightly against the shaft and confined by an annular resilient rubber ring 26, to which they are bonded.

The sealing means is held in place between an annular recessed shoulder 27 formed on casing 15 and a similar opposing shoulder 28 formed on an annular retaining ring 29. The casing 15 and the retaining ring 29 are secured to the front bearing support 11 by a plurality of bolts 30. An annular packing strip 31 is interposed between the casing 15 and support 11 in order to provide a slightly resilient connection between these two members and at the same time to provide a liquid-tight seal around the holes through which bolts 30 pass.

The shaft is journaled for rotation in a pair of spaced-apart self-oiling bearings 33 and 34 mounted in the front and rear bearing supports 11 and 12, respectively. The details of the bearing mountings are clearly shown in Fig. 3, but before proceeding with a description of these details it may be well to point out the features of the supports themselves. Referring particularly to Figs. 1 and 2, it may be noted that the supporting members are formed of relatively thin steel stampings suitably formed and welded together to provide an integral substantially rigid support for the rotatable cylinder 14.

The front bearing support 11 is made of a substantially triangular stamping 36 and a substantially U-shaped stamping 37 having a pair of legs 38 and 39, of which the former is welded to member 36 in a manner to be described specifically below. The triangular stamping 36 has a sufficient width at the base, to which it is fixedly secured at right angles to the axis of rotation as by welding, to provide lever arms of sufficient length on either side of the center line of the shaft 17 to withstand forces in a plane perpendicular to the rotation of cylinder 14 when the latter is rotated at high speeds and particularly when the textiles contained therein are not evenly distributed.

The rear bearing support 12 is made of a stamping 40 having a substantially U-shaped cross-section and provided with an upper vertical portion 41 welded to leg 39 of the U-shaped intermediate member 37. The stamping 40 is relatively narrow and lies substantially in a plane passing vertically through the axis of rotation of shaft 17. At the level of the bottom of the U-shaped intermediate member 37 the supporting member 40 is inclined toward the inner bearing support 11, as indicated at 42. This inclined portion passes through a central aperture 43 formed in member 36 and thence diagonally downward below the stationary casing 15, as indicated at 44, to a point of attachment to the base. The point of attachment is substantially directly below that end of cylinder 14 farthest removed from the bearings.

The three members 36, 37 and 40, from which the bearing support is fabricated, are formed to provide a rigid, well-braced structure. They are formed with complementary flanges providing additional rigidity, as well as a convenient means for securing the parts together in a suitable manner, such as by welding. The triangular member 36 is provided with a peripheral U-shaped channel consisting of an inclined portion 46 extending toward the centrifuge (away from the reader, as viewed in Figs. 2 and 5), a flat portion 47 lying in a line parallel to the central portion, and a peripheral portion 48 extending in a direction away from the centrifuge and substantially at right angles to the central portion. Formed integrally with the latter is a transverse flange 49 extending substantially around the member 36. The intermediate central portion 51 of member 36 is inclined upward and toward the centrifuge to meet portion 47 of the channel, as indicated by reference numeral 52. The two portions then extend downward and upward at the same angle and terminate in an upper vertical portion 53 around which the peripheral portion 48 extends. The upper vertically extending portion 53 is perforated and provided with an annular inturned flange 54 for a purpose that will appear shortly.

The form of the U-shaped intermediate member 37 is clearly disclosed in Fig. 4 and consists of legs 38 and 39 which extend in a transverse direction when the member is properly assembled, as may be seen from Fig. 1. The leg 38 is provided with projections 56 and 57 which extend downward and outward at right angles thereto. The latter, in turn, are provided with right angle flanges having vertical portions 58 and 59 and inclined portions 60 and 61, respectively. Legs 38 and 39 are provided with aligned apertures having flanges 62 and 63 extending in opposite directions from the respective legs.

Referring now more particularly to Figs. 1, 2 and 3, it may be seen that complementary portions on the U-shaped intermediate and triangular members are provided by (1) the upper end of leg 38 and flange 49, (2) vertically extending flanges 58 and 59 and the vertically extending portion 53, and (3) inclined flanges 60 and 61 and the inclined portion 51.

Before the above portions are secured together, a bearing sleeve 64, provided with an annular ring of oil-containing compound 65 and annular internal shoulders 66 at its ends for the reception of the oppositely disposed flanges 54 and 62, is inserted therebetween. Thereafter the complementary portions are welded together to form a unitary rigid front bearing support capable of resisting substantially all forces in a plane passing therethrough at an angle substantially perpendicular to the axis of rotation. Similar complementary portions are provided on leg 39 of the U-shaped member and the diagonal member 40 forming the rear bearing support. The latter is given considerable rigidity by a V-shaped channel formed substantially centrally thereof on the inclined portions 42 and 44.

The opposite parallel sides of the vertical portion 41 of the member 40 are provided with a transverse flange 69 having a shape corresponding to that of leg 39 of the U-shaped member so that these two parts may be secured to each other by welding. The vertical portion 41 is likewise provided with an aperture having an inturned flange 70 extending toward flange 63. Between these flanges is a second bearing sleeve 71 similar in all respects to sleeve 64, having opposite inner annular shoulders 72 into which the flanges extend securely to hold the bearing sleeve in place.

Longitudinal movement of the shaft in the bearings is prevented by a C washer 73 positioned in a groove 74 formed at the end of shaft 17. A resilient movement-restraining means for the shaft is provided by a spring washer 75 held between washers 76 and 77, one of which abuts against the rear bearing 34 and the other against the C washer.

In order to give the bearing support additional rigidity the inclined diagonal member 40 is secured to flanges 56 and 57 formed on leg 38 of the intermediate U-shaped member and to inclined right-angled flanges 78 and 79 formed on the sides and bottom of the aperture 43. The lower portions of flanges 56 and 57 are secured to member 40 by welding them to rectangular ears 80 and 81 formed integral with the latter substantially directly below the curved portion of the intermediate member. The right-angled flanges 78 and 79 are formed with internal dimensions corresponding to the external dimensions of the U-shaped diagonal member 40 so that the latter nests therein near the point where it passes through or intersects the triangular member 36.

The above described construction provides a rigid hollow box-like bearing support capable of resisting forces set up by rotation of the cylinder 14 when the distribution of textiles therein is such as to cause an unbalance thereof. The support is made of only three preformed members and requires but a slight amount of welding in its fabrication. The construction is such that the parts can be made and assembled very economically.

The cylinder shaft is rotated by means of a pulley 83 secured to the shaft intermediate the bearings 33 and 34. The pulley is rotated by a V belt 85 driven by a pulley 86 rotated by a motor 87 suitably mounted in a depressed portion 88 formed on base 13. The driving pulley 86 and motor 87 are located on opposite sides of the triangular supporting member 36 which is provided with a third aperture 89 through which the driving connection extends. This aperture is made sufficiently large to enable the motor 87 and driving pulley 86 to be removed for repairs or cleaning simply by releasing the belt and loosening the motor from the base. It should be noted that the construction of the support is such that an endless belt 85 may be used since the belt does not have to be threaded through any of the parts comprising the support. The belt is maintained taut by a spring-biased idler pulley 91 of any suitable construction.

The front end of the stationary casing 15 is supported by an upstanding member 92 to which it may be secured as by bolts 93. Member 92 is provided with integral tapered side arms or flanges 94 secured at their lower ends to the vertical sides of the U-shaped diagonal support 40. Member 92 is also secured to a curved end-closing portion 95 provided on support 40, thereby adding further to the rigidity of the support.

The apparatus described above may be secured to a floor or the like by means of a bolt (not shown) passing through a central opening 96 formed in the base 13. It has been found satisfactory to use only a single centrally located bolt, but it is obvious that a plurality of bolts may be used just as well.

The support itself has proved to be substantially rigid and satisfactory in use and has carried eccentric loads at substantial speeds without the creation of destructive vibration. In operation the cylinder 14 is rotated at a desired speed by the motor 87 which may be energized from a suitable source of energy. When the load within the cylinder is evenly distributed, the cylinder rotates without creating appreciable forces tending to cause vibration. However, if the load within the cylinder is not evenly distributed, then the forces created may be substantial.

These forces tend to cause a shift in the axis of rotation whereby the shaft assumes a gyratory as well as rotary motion, but this tendency toward gyratory motion is resisted by the described support. The front support, because of its substantially triangular construction, resists vertically acting forces and side thrust as well, because the base portion thereof provides lever arms on each side of the center line of the shaft to resist the side thrust. The rear support also resists vertically acting forces and side thrust, because of its rigid connection to the front support, thereby acting with the latter to restrict gyratory movement of the shaft.

However, the rear support, being made of relatively thin stamps is slightly flexible and, while it tends to resist any lateral movement of the shaft, permits slight gyratory movement of the shaft. Thus, the shaft 17 is not alone subjected to stresses created by unbalanced loads and there is accordingly less likelihood that it will be crystallized and crack after long use.

From the above description it is apparent that the support is substantially rigid and relatively light. It is made of a comparatively few metal stampings which may be readily welded together.

I claim:

1. A support for a centrifuge adapted to be rotated by a shaft mounted for rotation on a substantially horizontal axis on said support including, in combination, a base, a first member mounted in a vertical position on said base for supporting said shaft at a point adjacent the centrifuge, said member being provided with a centrally located aperture having vertically extending side and diagonally inclined bottom flanges, and a relatively narrow second member for supporting said shaft at a point spaced farther from said centrifuge than the first mentioned point, said member lying substantially in a plane passing vertically through the axis of rotation and extending diagonally downward through said aperture to said base and having side and bottom walls, said second member having its side and bottom walls secured to the flanges extending from said aperture and its lower end to said base.

2. A support for a centrifuge adapted to be rotated by a shaft mounted for rotation on said support including, in combination, a base substantially parallel to the shaft, an apertured first member mounted on said base perpendicular to the shaft for supporting said shaft at a point adjacent the centrifuge, a second member lying substantially in a plane perpendicular to the base and passing through the axis of rotation and extending diagonally downward through the aperture in said first-mentioned member to said base for supporting said shaft at a point spaced farther from said centrifuge than said first-mentioned point, and a substantially U-shaped third member connected to and securing together the portions of the two first-mentioned members extending above the aperture.

3. A support for a centrifuge adapted to be rotated by a shaft mounted for rotation on a substantially horizontal axis on said support, including in combination, a base, a substantially triangular transversely extending member mounted vertically on said base for supporting said shaft adjacent said centrifuge, said member being provided with a central aperture and a peripheral flange extending away from said centrifuge, a relatively narrow member extending diagonally downward through said aperture to said base for supporting said shaft at a point spaced farther from said centrifuge than the first mentioned point, said member being provided with a peripheral flange extending toward the centrifuge, and means including transversely extending flanges extending from said peripheral flanges and a substantially U-shaped transversely extending member connected to and securing together the portions of said two first mentioned members extending above said aperture.

4. A support for a centrifuge adapted to be rotated by a shaft mounted for rotation on a substantially horizontal axis of said support including, in combination, a base, a substantially triangular transversely extending member mounted vertically on said base for supporting said shaft adjacent said centrifuge, said member being provided with a central aperture and a peripheral flange extending away from said centrifuge in a direction parallel to the axis of rotation, a relatively narrow member lying substantially in a plane passing vertically through the axis of rotation for supporting said shaft at a point spaced farther from said centrifuge than said first-mentioned member, said second member comprising a vertically extending upper portion supporting said shaft, an intermediate diagonal portion extending through said aperture, an end diagonal portion extending to said base and a peripheral flange extending toward said centrifuge in a direction parallel to the axis of rotation, and means including integral flanges extending transversely outward from the upper flanged portions of each of said two first-mentioned members and a substantially U-shaped transversely extending member connected to and securing together the upper ends of said two first-mentioned members.

5. A support for a centrifuge adapted to be rotated by a shaft mounted for rotation on a substantially horizontal axis on said support including, in combination, a base, a substantially triangular transversely extending member mounted vertically on said base for supporting said shaft adjacent said centrifuge, said member comprising a central lower substantially vertical portion, an intermediate central portion inclined upward and toward the centrifuge, a peripheral U-shaped channel surrounding the central lower portion having its bottom directed toward the centrifuge and a depth such that the central inclined portion extends beyond the bottom of the channel and includes a portion of the side wall and bottom of the channel, an upper vertically extending portion, said lower, intermediate and upper portions being surrounded by the outer side of said U-shaped channel and a transverse flange formed integral with the latter, an aperture formed in said lower central portion, a relatively narrow member lying substantially in a plane passing vertically through the axis of rotation for supporting said shaft at a point spaced farther from said centrifuge than said first mentioned point, said second member comprising a vertically extending upper portion spaced from the upper end of said first member, a diagonal intermediate portion extending through said aperture and a diagonal end portion extending to said base, said second member being provided also with a peripheral flange extending toward the centrifuge, the upper portion of which has formed thereon an integral transverse flange, and a substantially U-shaped member for securing the two first mentioned members together to form a rigid box-like support, said member having transverse sides adapted to be welded to the transverse flanges on said first mentioned members and projections on the side facing the centrifuge extending at right angles said transverse sides, said projections having upper vertical ends and lower inclined ends, said ends having transverse flanges adapted to engage and to be welded to the upper vertical central portion and the intermediate inclined portion of the first mentioned member.

6. A support for a centrifuge secured at one end to a shaft mounted for rotation on a substantially horizontal axis on said support including, in combination, a base, a substantially triangular transversely extending member mounted vertically on said base and provided with an aperture for supporting said shaft at a point adjacent the centrifuge, said member being formed with a flanged aperture substantially centrally thereof, a second member provided with an aperture for supporting said shaft at a point spaced farther from the centrifuge than said first-mentioned point, said second member extending diagonally downward through said aperture and below the centrifuge to a point of attachment to said base, and a U-shaped member provided with opposed apertures and located between said first-mentioned members, said last mentioned member being secured to said first-mentioned members with said opposed apertures in alignment with said first-mentioned apertures.

7. A support for a pair of bearings including, in combination, a pair of spaced-apart members formed with aligned apertures, a U-shaped member therebetween provided with apertures in alignment with said first-mentioned apertures, bearing sleeves provided with shoulders at each end engageable by said apertures, and means for securing said members in spaced-apart relation with the shoulders on each sleeve in engagement with an aperture on said U-shaped member and an aperture on a predetermined one of said side members.

8. A support for a pair of bearings including, in combination, a pair of bearing sleeves, a pair of supporting members having spaced apart portions provided with aligned apertures of a size to receive and support ends of said sleeves, a substantially U-shaped member provided with similar aligned apertures in its leg portions, said U-shaped member having its aperture leg portions spaced apart a lesser distance than the aperture portions of said first mentioned members, whereby each of said sleeves is supported by one of said supporting members and one leg of the U-shaped member.

9. A support for a pair of bearings including, in combination, a pair of bearing sleeves provided with shoulders at each end, a pair of spaced-apart members formed with aligned flanged apertures, a U-shaped member therebetween formed with flanged apertures in alignment with said first mentioned apertures, and means securing said members in spaced-apart relationship with the flanges in said shoulders for holding said sleeves in place.

10. A support for a pair of bearings including, in combination, a pair of spaced-apart members formed with aligned flanged apertures, a U-shaped member therebetween formed with flanged apertures in alignment with said first-mentioned apertures, bearing sleeves provided with internal shoulders at their ends adapted to receive said flanges, and means securing said members in spaced-apart relationship with the flanges in said shoulders for holding said bearing sleeves in place.

11. A support for a pair of bearings including, in combination, a pair of spaced-apart members having internally flanged apertures, a substantially U-shaped member having externally flanged apertures, bearing supporting sleeves having shoulders at opposite ends engageable by said flanges, said members being provided with means for securing them together in spaced apart relationship with each bearing sleeve securely held in place by a flange on one of said pair of members and a flange on said U-shaped member.

12. A support for a centrifuge mounted at one end to a shaft journalled for rotation in a pair of spaced-apart bearings and means including a motor, a pulley on said shaft between said bearings, a pulley driven by the motor shaft and belt means for transmitting power from one pulley to the other for rotating said shaft including, in combination, a base, a substantially triangular member mounted in vertical position on said base and formed with a first aperture near its apex to provide a support for one of said bearings, a flanged second aperture located centrally of said member, and a third aperture below and to one side of said second aperture, a second member formed with an aperture near its upper end to provide a support for the second of said pair of bearings, said second member extending vertically downward in spaced relationship with the first member and then diagonally downward through said flanged aperture to the base, and a U-shaped member having spaced-apart legs fitting between and secured to the spaced-apart vertically extending portions of said first-mentioned members providing a space therebetween for said first-mentioned pulley, said legs being formed with apertures aligned with the upper aperture of the first member and the aperture in the second member supporting said pair of bearings, said motor being mounted on the base below and to one side of said centrifuge, and having a driving connection to said second-mentioned pulley extending through the third aperture formed on said first member, whereby the belt connecting the two pulleys may be of the endless type and readily removable without necessity of considerable movement of the motor or pulley driven thereby.

13. Apparatus of the type described including, in combination, a base, an apertured member mounted vertically near the rear end of said base, a second member having an upper vertical portion disposed behind the upper end of said first-mentioned member and a diagonal second portion extending through said aperture to a point of attachment near the front of said base, a U-shaped third member connected to and securing together the portions of the two first-mentioned members extending above said aperture and forming therewith a pair of bearing supports, a vertically extending supporting member extending upwardly at the front of said base, a stationary receptacle mounted between the first and last mentioned members, a centrifuge within said receptacle having a shaft secured to and projecting from its side, said shaft being journaled in said bearings, and means for driving said shaft.

ALFRED H. HABERSTUMP.